(12) United States Patent
Manohara et al.

(10) Patent No.: US 8,387,465 B2
(45) Date of Patent: Mar. 5, 2013

(54) CARBON NANOTUBE VACUUM GAUGES WITH WIDE-DYNAMIC RANGE AND PROCESSES THEREOF

(75) Inventors: Harish Manohara, Arcadia, CA (US); Anupama B. Kaul, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 1086 days.

(21) Appl. No.: 12/323,017

(22) Filed: Nov. 25, 2008

(65) Prior Publication Data

US 2011/0174079 A1    Jul. 21, 2011

Related U.S. Application Data

(60) Provisional application No. 61/005,064, filed on Nov. 30, 2007.

(51) Int. Cl.
G01L 9/00 (2006.01)
(52) U.S. Cl. ........................................... 73/753
(58) Field of Classification Search ................ 73/31.06, 73/31.04, 753
See application file for complete search history.

(56) References Cited

U.S. PATENT DOCUMENTS

| | | | |
|---|---|---|---|
| 7,013,708 B1 * | 3/2006 | Cho et al. | 73/31.05 |
| 7,394,118 B2 * | 7/2008 | Zhou | 257/253 |
| 2003/0121764 A1 * | 7/2003 | Yang et al. | 200/262 |
| 2007/0086921 A1 * | 4/2007 | Visel et al. | 422/88 |
| 2008/0231361 A1 * | 9/2008 | Ludwig | 330/252 |
| 2009/0165533 A1 * | 7/2009 | Han et al. | 73/31.06 |
| 2010/0050745 A1 * | 3/2010 | Liu et al. | 73/31.06 |
| 2010/0056892 A1 * | 3/2010 | Ben-Barak et al. | 600/354 |
| 2010/0282245 A1 * | 11/2010 | Star et al. | 128/200.14 |
| 2010/0284002 A1 * | 11/2010 | Li et al. | 356/301 |
| 2010/0308848 A1 * | 12/2010 | Kaul | 324/693 |
| 2011/0051775 A1 * | 3/2011 | Ivanov et al. | 374/143 |
| 2011/0062418 A1 * | 3/2011 | Ludwig | 257/24 |
| 2011/0174079 A1 * | 7/2011 | Manohara et al. | 73/753 |
| 2011/0177493 A1 * | 7/2011 | Lu | 435/5 |

OTHER PUBLICATIONS

"An Electrothermal Carbon Nanotube Gas Sensor". Takeshi Kawano, Heather C. Chiamori, Marcel Suter, Qin Zhou, Brian D. Sosnowchik, Liwei Lin. 'Nano Letters' 2007 7 (12), 3686-3690.*
"Thermally and Molecularly Stimulated Relaxation of Hot Phonons in Suspended Carbon Nanotubes". David Mann,†Eric Pop,†,‡Jien Cao,†Qian Wang,†Kenneth Goodson,‡ Hongjie Dai*,† 'The Journal of Physical Chemistry' B 2006 110 (4), 1502-1505.*

* cited by examiner

Primary Examiner — Lisa Caputo
Assistant Examiner — Jamel Williams
(74) Attorney, Agent, or Firm — Sheppard, Mullin, Richter & Hampton LLP (57) ABSTRACT

A miniature thermal conductivity gauge employs a carbon single-walled-nanotube. The gauge operates on the principle of thermal exchange between the voltage-biased nanotube and the surrounding gas at low levels of power and low temperatures to measure vacuum across a wide dynamic range. The gauge includes two terminals, a source of constant voltage to the terminals, a single-walled carbon nanotube between the terminals, a calibration of measured conductance of the nanotube to magnitudes of surrounding vacuum and a current meter in electrical communication with the source of constant voltage. Employment of the nanotube for measuring vacuum includes calibrating the electrical conductance of the nanotube to magnitudes of vacuum, exposing the nanotube to a vacuum, applying a constant voltage across the nanotube, measuring the electrical conductance of the nanotube in the vacuum with the constant voltage applied and converting the measured electrical conductance to the corresponding calibrated magnitude of vacuum using the calibration. The nanotube may be suspended to minimize heat dissipation through the substrate, increasing sensitivity at even tower pressures.

8 Claims, 5 Drawing Sheets

CARBON NANOTUBE VACUUM GAUGES WITH WIDE-DYNAMIC RANGE AND PROCESSES THEREOF

CROSS-REFERENCE TO RELATED APPLICATIONS

This application claims priority to Provisional Application Ser. No. 61/005,064, filed Nov. 30, 2007, the disclosure of which is incorporated herein by reference.

STATEMENT REGARDING FEDERAL SPONSORSHIP

The invention described herein was made in the performance of work under a NASA contract, and is subject to the provisions of Public Law 96-517 (35 USC 202) in which the Contractor has elected to retain title.

BACKGROUND OF THE INVENTION

With exceptional materials properties, carbon nanotubes offer tremendous opportunities for scientific and technological exploration. Since their discovery more than a decade ago their use in electronics applications continues to grow, as exemplified by CNT-based field-effect-transistors (FETs) memory devices and tunable oscillators.

Recently, carbon nanotubes have also been applied to pressure sensing based on piezoresistance, opening up yet another promising application of nanotubes. For piezoresistance pressure sensing devices, a metallic single-walled-nanotube is placed on a membrane of atomic-layer-deposited (ALD) alumina. A pressure differential across the membrane causes the membrane to bulge, inducing strain in the overlying single-walled-nanotube. Strain-induced conductivity changes of <12% in non-vacuum environments (760-900 Torr) have been reported.

Other pressure measuring devices are available. Popular thermal conductivity gauges not employing single-walled-nanotubes such as Pirani or thermocouple gauges operate on principles of thermal exchange between a voltage-biased element and the surrounding gas. Such gauges are physically large (volume ~10 cm$^3$), prohibiting their integration with many vacuum-encased Si-based micro-cavity applications (vacuum microelectronics, micro-eletromechanical-systems (MEMS) such as gyroscopes and RF switches). As a result of their large thermal mass, such thermocouple gauges are inherently slow, and also operate at substantial power levels and high temperatures.

With the advent of MEMS technology, miniaturized, low power pressure sensors have been developed, a first application of bulk Si-micromachining. Many of these Si-based transducers operate on the piezoresistive or capacitive principle. Obtaining wide dynamic range with these transducers has been challenging; and yet achieving wide dynamic range is especially important in micro-cavity applications. Due to the small volumes in micro-cavities, outgassing can cause large pressure changes over short periods, affecting device performance and requiring monitoring by sensors capable of wide dynamic range.

SUMMARY OF THE INVENTION

The present invention is directed to a miniature thermal conductivity gauge and process employing a carbon single-walled-nanotube. The gauge operates on the principle of thermal exchange between a voltage-biased carbon nanotube and the surrounding gas at low levels of power and low temperatures to measure variations in electrical conductance, measured by current at constant voltage, indicative of the magnitude of vacuum across a wide dynamic range. Due to the reduced dimensionality for thermal conduction and phonon relaxation in one dimensional materials, transport is strongly influenced by environmental factors. The high surface area of the one dimensional single-walled-nanotube, along with its high temperature coefficient of resistivity (TCR), enables substantial pressure sensitivity. The single-walled-nanotube may be suspended to minimize heat dissipation through the substrate, increasing sensitivity at even lower pressures.

In a first aspect of the present invention, the vacuum gauge has two terminals, a source of constant voltage to the terminals, a single-walled carbon nanotube in electrical communication between the terminals, a calibration of measured electrical conductance of the nanotube to magnitudes of vacuum about the single-walled carbon nanotube and a current meter in electrical communication with the source of constant voltage.

In another aspect of the present invention, such a vacuum gauge may employ a single-walled carbon nanotube in the range of 5 µm to 10 µm in length between the terminals. Further, the temperature coefficient of resistivity α of the vacuum gauge including the terminals and the single-walled carbon nanotube may be configured to be in the magnitude of −0.01 K$^{-1}$.

The process for measuring vacuum includes calibrating the electrical conductance of a single-walled carbon nanotube to magnitudes of vacuum, exposing the nanotube to a vacuum, measuring the electrical conductance of the nanotube in vacuum with a constant voltage applied and converting the measured electrical conductance to the corresponding calibrated magnitude of vacuum using the nanotube calibration.

Accordingly, an improved vacuum gauge and process for the measurement of vacuum are contemplated. Other and further objects and advantages will appear hereinafter.

DETAILED DESCRIPTION OF THE PREFERRED EMBODIMENTS

Figure 1:
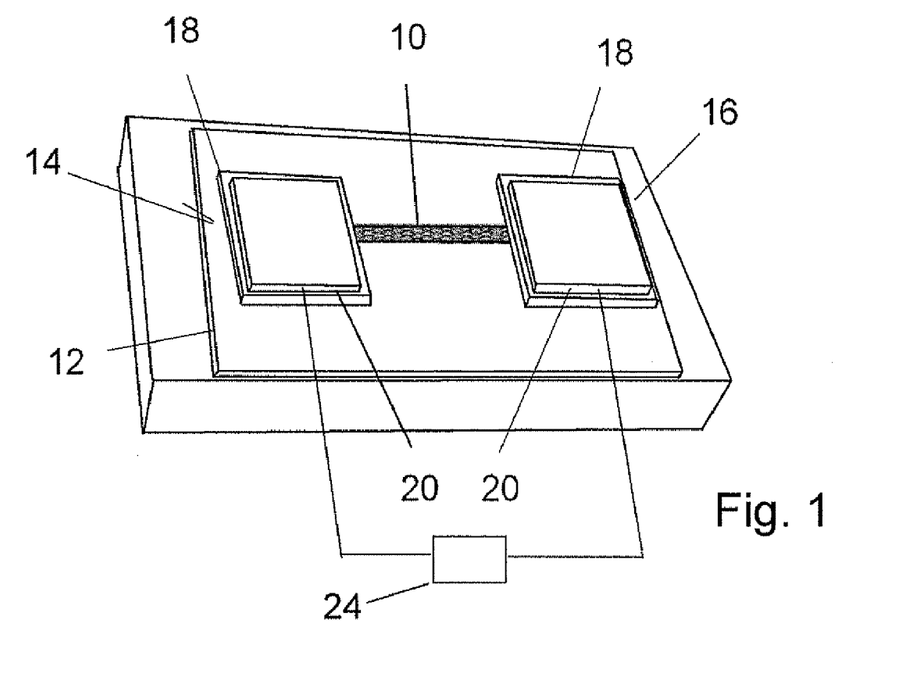
FIG. 1 is a schematic view of a SWNT contacted on either end by Au/Cr electrodes.

A miniature carbon nanotube (CNT) based thermal conductivity gauge is schematically illustrated in FIG. 1. A single-walled-nanotube (SWNT) 10 is supported on an SiO$_2$ substrate 12. Two Au/Cr electrodes 14, 16 formed on the substrate 12 receive the ends of the SWNT 10. The SiO$_2$ substrate 12 may be etched away beneath the SWNT 10 to suspend the SWNT 10 from the electrodes 14, 16 in separation from the substrate 12. The typical tube length of the SWNT 10 between electrodes is 5 μm to 10 μm. The miniature CNT-based thermal conductivity gauge has a volume ~10$^{-4}$ cm$^3$ and operates at low power (nW-μW) and low temperatures. The CNT gauge exhibits a wide dynamic range of 760 Torr-10$^{-6}$ Torr.

Figure 2:
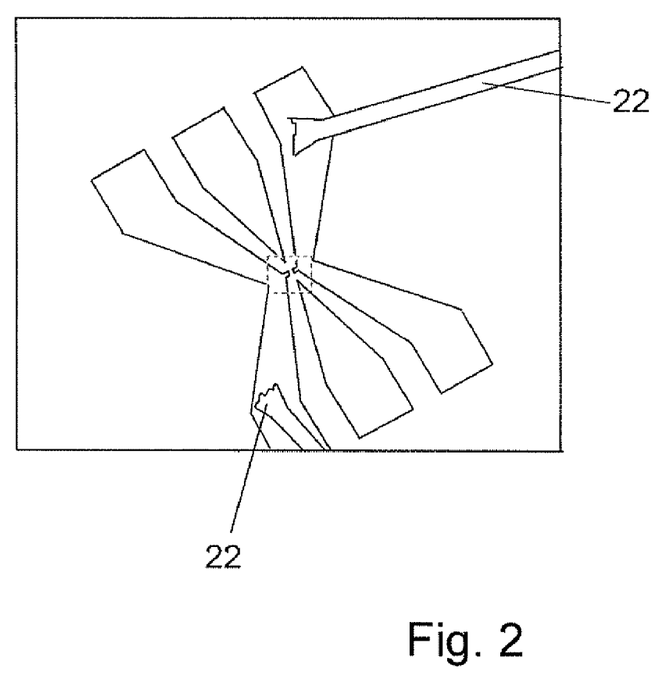
FIG. 2 is a low magnification scanning electron microscope image of a wire-bonded CNT vacuum gauge.

In fabrication, the starting substrate is a thermally oxidized <100> Si wafer 12. Patterned chemical vapor deposited growth of the SWNT 10 employs Fe-catalyst. Reference is made to J. Kong, H. Soh, A. Cassell, C. F. Quate, and H. Dai, "Synthesis of individual single walled carbon nanotubes on patterned silicon wafers," *Nature*, vol. 395, pp. 878-881, 1998, the disclosure of which is incorporated herein by reference. Following growth of the SWNT 10, Au/Cr electrodes 14, 16, with the Cr 18 being 5 nm thick and the Au 20 being 250 nm thick, are fabricated by e-beam deposition patterned by liftoff. In order to release the SWNT 10 to be maintained displaced from the substrate, the SiO$_2$ wafer 12 beneath the SWNT 10 is etched in a buffered oxide etch, followed by critical point drying such that the electrodes 14, 16 on either end clamp the tube 10 in place. A low magnification SEM image of a completed gauge is shown in FIG. 2, which also shows the wire-bonds 22 for electrically contacting the gauge.

Figure 3:
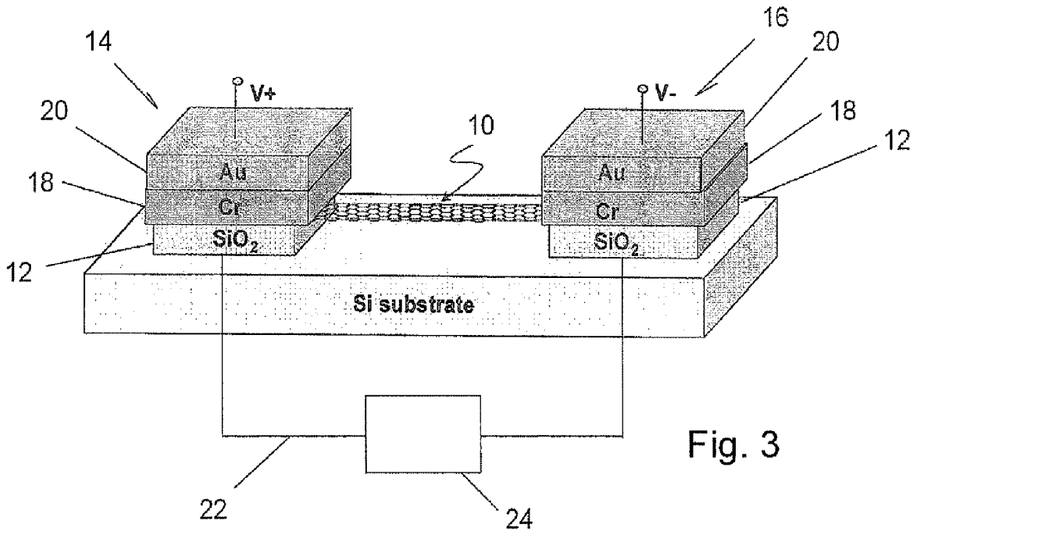
FIG. 3 is a schematic view of a CNT vacuum gauge with the SWNT released from the SiO$_2$ substrate.

A miniature CNT-based thermal conductivity gauge with the substrate 12 etched away or otherwise fabricated is depicted in FIG. 3. SWNT growth and electrode deposition was conventionally carried out. See H. M. Manohara, E. W. Wong, E. Schlecht, B. D. Hunt, and P. H. Siegel, Nano Lett. 5, 1469 (2005), the disclosure of which is incorporated herein by reference.

The gauge operates on the principle of thermal exchange between the voltage-biased carbon nanotube 10 and the surrounding gas. Reference is made to H. Manohara and A. B. Kaul, "High sensitivity, broad range vacuum gauge using nanotubes for micromachined cavity applications," *New Tech. Rep.* #445383, JPL, August 2007, the disclosure of which is incorporated herein by reference. In using this principle, a constant voltage is applied across the nanotube 10 and current is measured, reflective of conductivity with a constant bias voltage, which correlates with the vacuum in the surrounding gas over a wide dynamic range of 760 Torr-10$^{-6}$ Torr or greater.

A CNT gauge as fabricated above was placed in a bell jar (diameter ~50 cm) equipped with a mechanical pump that pumped the system from 760 Torr to ~35 mTorr. The gate valve was then opened and a cryo pump reduced the chamber to its ultimate pressure of ~1×10$^{-7}$ Torr. Pressure over many pumping cycles was recorded to get a calibrated pressure-time plot. Two terminal electrical measurements were performed by contacting the wire-bonded gauge on a chip carrier through co-axial cables in an electrical feed through from the chamber that attached to an HP 4156C, a semiconductor parameter analyzer to measure electrical conductance. The analyzer 24 was operated in the constant voltage mode and measured current through the SWNT 10, where the current through the gauge was sampled over one second intervals as the pressure changed from ambient to low vacuum to obtain a calibration of measured electrical conductance of the gauge to the magnitudes of surrounding vacuum. The gauge was usually immersed in nitrogen prior to each pump down cycle.

Figure 4:
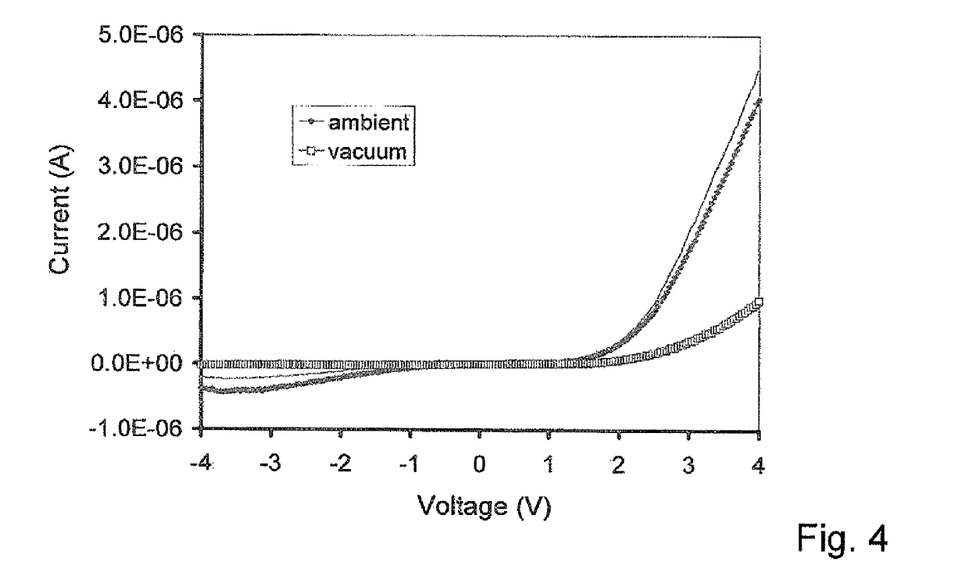
FIG. 4 is a chart of averaged I-V characteristics of a CNT pressure sensor taken at 2 static pressures: ambient (760 Torr) and vacuum (~10$^{-7}$ Torr) with the thin curve representing 1−σ deviation in current over multiple pump-down cycles for the ambient curve indicating excellent repeatability. The deviation curve for the vacuum curve cannot be seen as it falls within the resolution of the vacuum curve itself.

Shown in FIG. 4 is an I-V-characteristic of a CNT vacuum gauge taken at two static pressures (760 Torr and 10$^{-7}$ Torr) over multiple pump-down cycles. A change in electrical conductivity is detected for pressure changes spanning more than nine-orders of magnitude. Aside from this wide-dynamic range, these gauges should be well-suited for their integration in microcavity applications due to their miniature size that does not perturb the local environment. FIG. 4 also illustrates that multiple pumping cycles yielded highly reproducible I-V plots as the 1-σ plots (dashed lines) indicate. The data suggests that there is a clear trend of reduced electrical conductance at low pressures. It also suggests that neither the contacts nor the tubes are changed irreversibly as a result of biasing the gauges over repeated pressure cycles. This is unlike earlier gauges that had Ti electrodes where run-to-run electrical conductance repeatability was poor after multiple pressure cycles. While Ti wets SWNT sidewalls readily, its propensity for oxidation at the interface while the gauges are electrically biased during pumping cycles, is possibly one reason for encountering the greater run-to-run variability. The presence of multiple tubes may also result in device-to-device resistance variability. The Cr electrode devices typically had high contact resistances (100's kΩ-few MΩ). Despite the diffusive nature of the contacts, a clear trend in reduced electrical conductance at low pressures was observed, with little run-to-run variation over multiple cycles that spanned several weeks.

Figure 5:
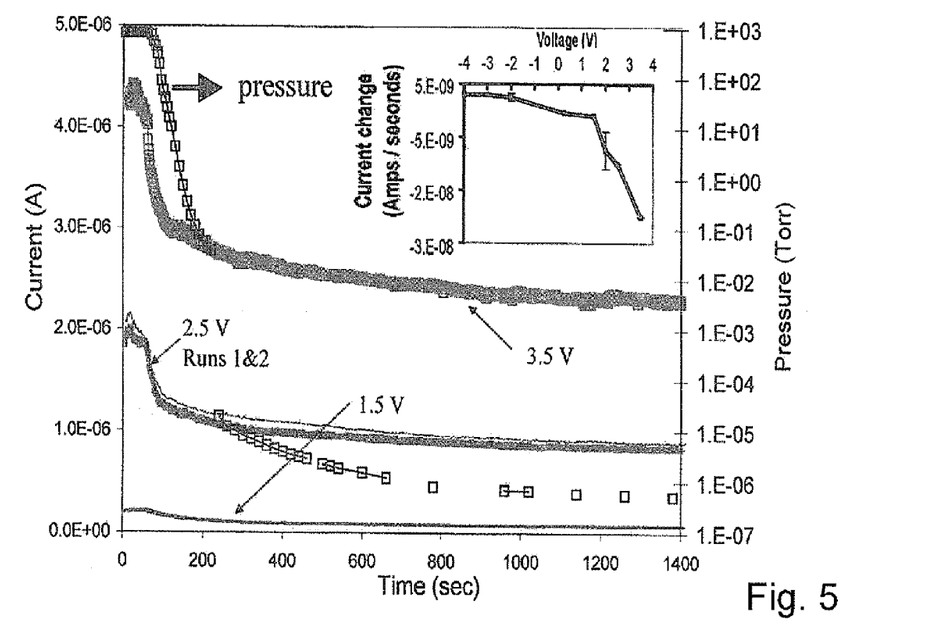
FIG. 5 is a chart of the dynamic pressure response of the device in FIG. 4 over multiple cycles and varying bias voltages with the insert showing the response of the device in a linear regime at various bias levels ranging from −4 V to 3.5 V.

FIG. 5 shows the dynamic response of electrical conductance as a function of time/pressure for the gauge employed for the data in FIG. 4 over multiple cycles and varying bias voltages. After about 60 sec. at ambient, the roughing valve was opened. A discontinuity in the pressure signal occurs at about 220 sec. or ~40 mTorr which is where the transition from the mechanical pump to the cryo pump takes place. The electrical conductance of the CNT gauge decreases rapidly initially (760 Torr-1 Torr) and less rapidly afterwards. The local cooling effect associated with the pump down influences the resistance of the current carrying element, which in this case is the SWNT. Since the TCR values were measured to be negative for the CNT gauge, as will be discussed below, the reduced temperatures manifest themselves as electrical conductance decrease at low pressures, as FIG. 5 depicts. Higher pressures generate higher collision rates and thus greater cooling. As the pressure decreases, the molecular mean free path becomes longer, decreasing the collision rate, and the CNT response to local cooling becomes less sensitive, as can be seen beyond about 180 sec. (~100 mTorr) in FIG. 5.

As shown in FIG. 5, these gauges were biased at voltages ranging from −4 V to 3.5 V, and as the bias was increased in the forward-biased regime, the rate of change in the initial (or linear) portion of the current-time curve became more pronounced; this is indicated by the inset of FIG. 5. In the reverse-bias regime, the current change appeared to saturate beyond about −2 V.

Figure 6:
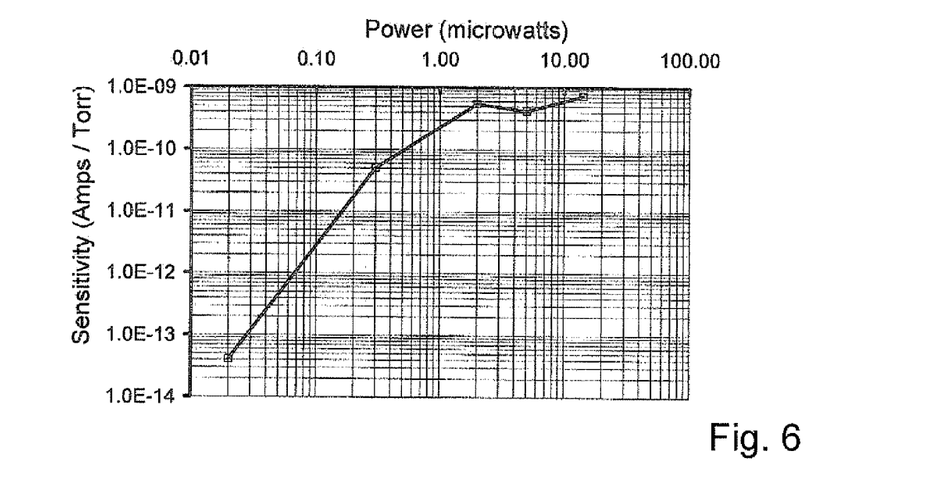
FIG. 6 is a chart of the pressure sensitivity (A/Torr) for a CNT pressure sensor as a function of power from 760 Torr to ~50 Torr.

The vacuum gauge sensitivity (amps/Torr) is depicted as a function of the input power in FIG. 6. In the initial or rapid-pressure change regime that appears linear, the sensitivity increased as a function of power. At powers as low as ~20 nW, a measurable sensitivity of ~40 fA/Torr was noted, but it approached ~1 nA/Torr as the bias power was increased to ~14 μW. Similar behavior has been observed in earlier thermal conductivity gauges (although at powers approaching ~1 mW). Reference is made to A. M. Robinson, P. Haswell, R. P. Lawson, and M. Parameswaran, "A thermal conductivity microstructural pressure sensor fabricated in standard complimentary metal-oxide semiconductor," *Rev. Sci. Instrum.*, vol. 63, no. 3, pp. 2026-2029, 1992, the disclosure of which is incorporated herein by reference. Sensitivity was found to increase with current in such gauges, presumably due to greater changes in temperature at high powers. At very high powers there is a danger of catastrophic failure due to burnout, but this regime was not actively investigated in our measurements.

With input power supplied to the bias element, represented by energy $E_t$, heat dissipation can occur via the substrate ($E_s$), radiation ($E_r$) or the gas ($E_g$). See W. J. Alvesteffer, D. C. Jacobs, and D. H. Baker, "Miniaturized thin film thermal vacuum sensor," *J. Vac. Sci. Technol.* A, vol. 13, pp. 2980-2985, 1999, the disclosure of which is incorporated herein by reference. This is shown by Eqn. (1):

$$E_t = E_s + E_r + E_g \quad (1)$$

The heat dissipated through the substrate is $$E_s = (K \Delta T A)/L \quad (2)$$

where A is the area through which heat transfer occurs, K is the thermal conductivity of the $SiO_2$, $\Delta T$ is the temperature difference between the current carrying element and the substrate and L is the distance from the element to the substrate.

Radiative losses are given by (3) where σ is the Stefan-Boltzmann radiation constant, ε is the thermal emissivity of the element, and $T_h$ and $T_a$ are the temperatures of the element and ambient, respectively.

$$E_r = \sigma \epsilon (T_h^4 - T_a^4) A \quad (3)$$

Finally, heat dissipation by the gas is given by $E_g$, $$E_g = \alpha_r \Lambda_t A P (T_h - T_a) \sqrt{\frac{273}{T_h}} \quad (4)$$

where $\alpha_r$ is the accommodation coefficient, $\Lambda_t$ is the free molecule thermal conductivity, A is the surface area of the element, and P is the pressure.

Figure 7:
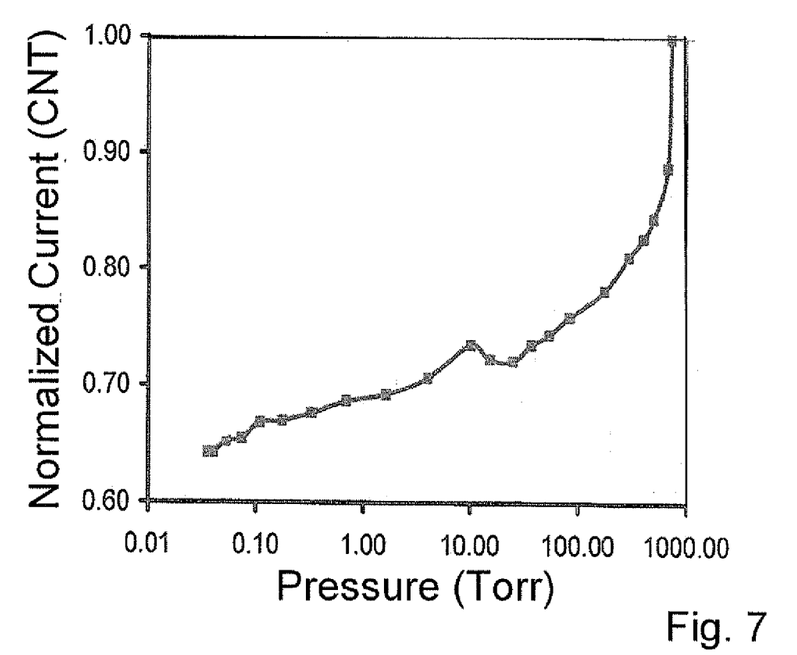
FIG. 7 is a chart of normalized current-pressure response at 2 µW for the calibration resistor and unreleased CNT device.

While the radiative and substrate losses become more significant at low pressures, the thermal conductivity of the gas is a predominant loss mechanism in the viscous flow regime (0.01<$K_n$<10, where $K_n$ is Knudsen's number). The heat dissipation in this regime depends linearly on pressure as illustrated by Knudsen's formula (Eqn. 4). Shown in FIG. 7, is the current (normalized) as a function of pressure for the CNT gauge, biased at a few watts of power. The CNT gauge shows a rapid and continuous decrease in current from ambient to ~40 mTorr, with more than 35% change in electrical conductance.

Figure 8:
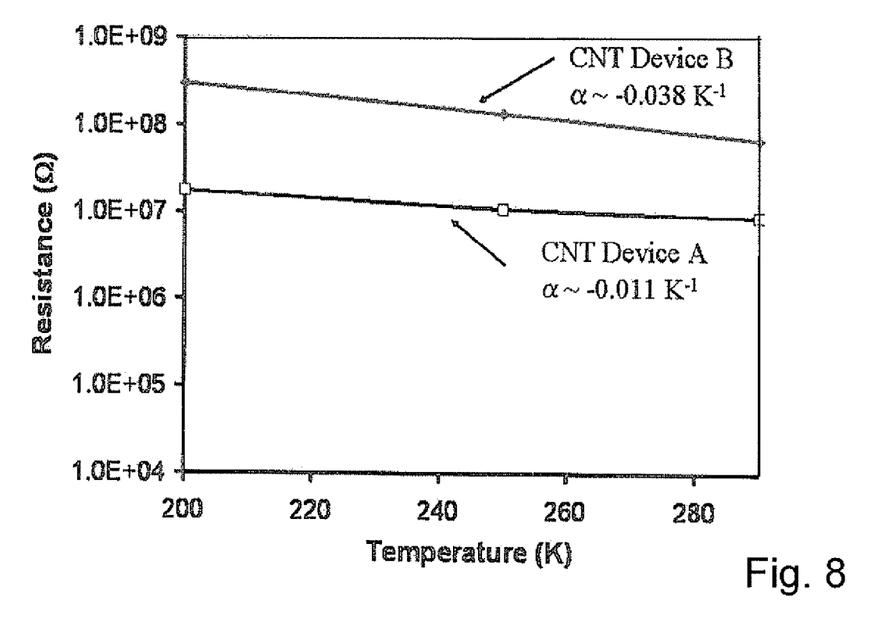
FIG. 8 is a chart of TCR, q of two CNT devices A & B measured to be ~0.011 K$^{-1}$ and ~0.038 K$^{-1}$, respectively, from 290 K down to 200 K.

The form of the two behaviors can be explained on the basis of TCR. FIG. 8 shows the TCR for two CNT gauges measured between 200-300 K. The CNT gauge has a negative TCR, with the current decreasing steadily into the mTorr range.

The CNT gauge shows a sensitivity (>35% change) from ambient to 40 mTorr. The nanotube gauge has a high surface area to volume ratio, and Eqn. (4) suggests this would increase sensitivity. In addition, a large magnitude of TCR for the CNT gauges should also enhance sensitivity. CNT Gauges A and B were measured to have a TCR α of −0.011 $K^{-1}$ and −0.038 $K^{-1}$ (between 200-300 K), respectively. Many metallic materials used in Pirani gauges have α<+0.005 $K^{-1}$. For the CNT gauge in FIG. 7, the temperature change from ambient to ~40 mTorr was calculated to be −20 K, assuming α~−0.038$K^{-1}$. Standard Pirani gauges operate at significantly higher temperatures.

There appears to be a vast disparity between various reports on the TCR of nanotubes, and recent theoretical modeling has shown that TCR may be negative, zero, or positive depending on the lengths and diameters of the CNTs. Reference is made to A. Naeemi and J. D. Meindl, "Physical modeling of temperature coefficient of resistance for single- and multi-wall carbon nanotube interconnects," *IEEE Electron Dev. Lett.* vol. 28, pp 135-138, 2007, the disclosure of which is incorporated herein by reference. Experimental reports on SWNTs show increased electrical conductance below 290 K, characteristic of electron-phonon interactions as in metals, with the acoustic phonon scattering being further suppressed at LHe temperatures. See J. Kong, E. Yenilmez, T. Tombler, W. Kim, L. Liu, C. Jayanthi, S. Wu, R. Laughlin, and H. Dai, "Quantum interference and ballistic transmission in nanotube electron waveguides," *Phys. Rev. Lett*, vol. 87, 106801-1-4, 2001; C. Zhou, J. Kong, and H. Dal, "Intrinsic electrical properties of individual single-walled carbon nanotubes with small band gaps," *Phys. Rev. Lett*, vol. 84, no. 24, pp. 5604-5607, 2000, the disclosures of which are incorporated herein by reference.

Experimentally, negative TCR or conductance suppression in SWNTs at low temperatures has also been observed. See W. Jang, N. N. Kulkarni, C. K. Shih, and Z. Yao, "Electrical characterization of individual carbon nanotubes grown in nanoporous anodic alumina templates," *Appl. Phys. Lett.*, vol. 84, pp. 1177-1179, 2004; Y. F. Hsiou, Y. J. Yang, L. Stobinski, W. Kuo, and C. D. Chen, "Controlled placement and electrical contact properties of individual multiwalled carbon nanotubes on patterned silicon chips," *Appl. Phys. Lett*, vol. 84, pp. 984-986, 2004; S. Tans, M. Devoret, H. Dai, A. Thess, R. Smalley, L. J. Geerligs, and C. Dekker, "Individual single-wall carbon nanotubes as quantum wires," *Nature*, vol. 386, pp. 474-477, 1997, the disclosures of which are incorporated herein by reference. This is most likely associated with the quality of both the electrical contacts and the nanotubes themselves. Large contact resistances are suggestive of tunnel barriers, where the tunneling rate decreases with decreasing temperature. Long SWNTs are also susceptible to scattering by defects, and have a higher likelihood of possessing physical bends which can result in reduced electrical conductance at low temperatures. The electrical conductance measurements of the pressure sensor gauges, with their long lengths (>5 μm) along with the diffusive characteristics of the contacts, would both contribute to the negative TCR observed in the gauges as indicated above as measured with CNT Gauges A and B in the magnitude of −0.01 $K^{-1}$. The terminals are understood to contribute to this negative TCR; and great care to avoid oxides in the terminal material, often undertaken in conventional microterminal fabrication, is not contemplated for these CNT vacuum gauges.

At low pressures (<100 mTorr), conduction through the gas becomes less significant and other pressure independent mechanisms such as radiative losses and solid-state conduction through the substrate tend to dominate, as seen by Eqns. 2 and 3. Although radiative losses may be minimal at the low operational temperatures (or power) of the CNT gauges, the losses through the substrate have been calculated to be significant in the low vacuum regime.

Figure 9:
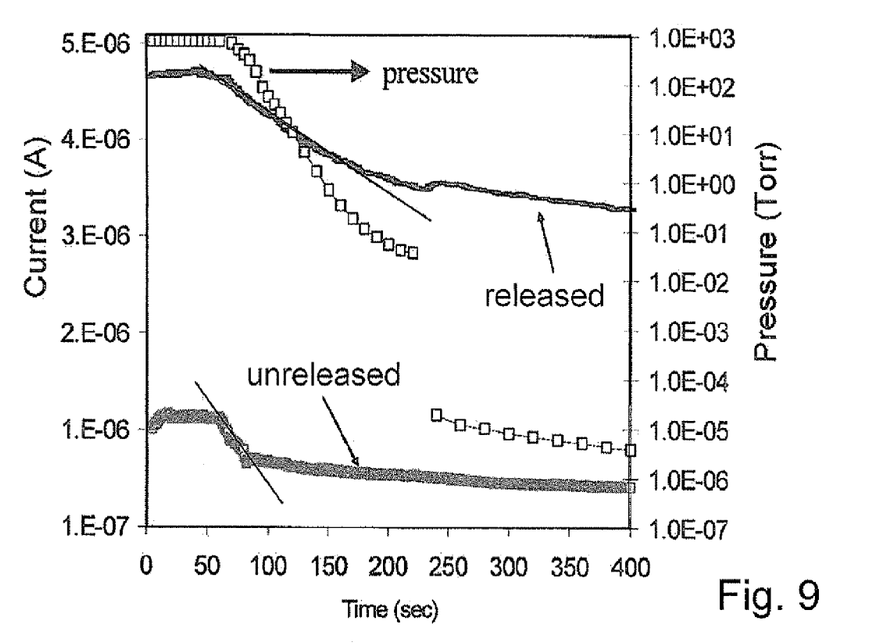
FIG. 9 is a chart of absolute current variation for released and unreleased device vs. time/pressure at ~2 μW.

Although an air gap provides optimal thermal insulation, and thus maximal heat transfer to the gas, a substrate with a lower thermal conductance K could also minimize substrate losses, as seen from Eqn. 4. Shown in FIG. 9 is the pressure response of a CNT gauge before and after it was released from the $SiO_2$ substrate; the devices were released in 10:1 buffered oxide etch, which terminated with critical point drying in IPA. As it can be seen, the released CNT gauge has a continued decrease in conductance well into the $10^{-5}$ Torr range while the unreleased device shows little variation after about ~100 sec (~1 Torr), in this case.

This data appears to confirm that by removing a part of the substrate underneath the current carrying element, sensitivity is increased into the lower pressure ranges. It is also interesting to note that at the crossover point from the mechanical pump to the cryo pump, a slight perturbation in the conductance data for the released device was observed, which would be expected since the released device is probably more susceptible toward mechanical fluctuations.

Figure 10:
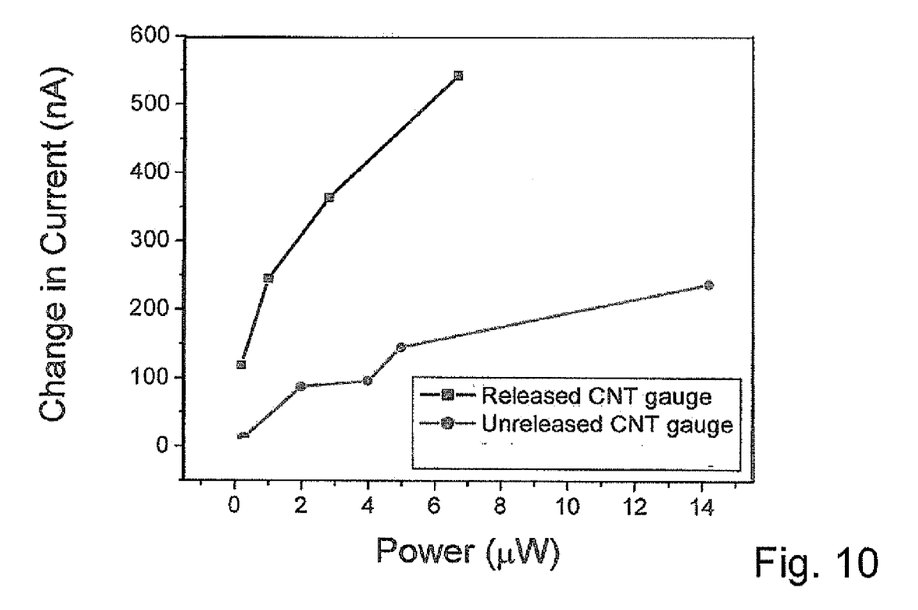
FIG. 10 is a chart of net current change from ~5×10$^{-6}$ Torr to ~8×10$^{-7}$ Torr for released and unreleased CNT sensors as a function of bias power.

The increase in sensitivity after substrate removal is perhaps better exemplified by the data in FIG. 10 which shows the net current change ($\Delta I$) for released and unreleased device in the pressure range of $\sim 5 \times 10^{-6}$ Torr to $\sim 8 \times 10^{-7}$ Torr. In both cases, $\Delta I$ increases with power but the released devices has a three times larger change than that of the unreleased device (at a power of ~6 µW, $\Delta I_{released} \sim 550$ nA, compared to $\Delta I_{unreleased} \sim 150$ nA). The relationship of power affecting sensitivity appears to be in agreement with FIG. 6, and the combined results suggest that the greatest sensitivity is expected for the released devices operated at high power.

In summary, a scheme for using 5-10 µm long, diffusively contacted SWNTs as thermal conductivity vacuum gauges has been presented. Pressure sensing was demonstrated over a wide dynamic range from atmosphere to $10^{-6}$ Torr, at low power. The removal of the substrate beneath helped to extend the pressure response to $\sim 10^{-6}$ Torr. More work will fully characterize the effect of tube chirality, length and transparency at the contacts. CNT based thermal vacuum gauges appear to have wide dynamic range for pressure sensing in vacuum-encased microcavity applications. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A process for measuring vacuum, comprising
calibrating the electrical conductance of a single-walled carbon nanotube to magnitudes of vacuum;
exposing the single-walled carbon nanotube to a vacuum;
applying a constant voltage across the single-walled carbon nanotube;
measuring the electrical conductance of the single-walled carbon nanotube in the vacuum with the constant voltage applied;
converting the measured electrical conductance to the corresponding calibrated magnitude of vacuum using the calibration of the single-walled carbon nanotube.

2. The process of claim 1 wherein the single-walled carbon nanotube is retained by terminals at the ends of the single-walled carbon nanotube and further comprising
maintaining the single-walled carbon nanotube displaced from solid structure between the terminals.

3. A vacuum gauge comprising
two terminals;
a source of constant voltage to the terminals;
a single-walled carbon nanotube in electrical communication between the terminals;
a calibration of measured electrical conductance of the single-walled carbon nanotube to magnitudes of vacuum about the single-walled carbon nanotube;
a current meter in electrical communication with the source of constant voltage.

4. The vacuum gauge of claim 3 further comprising
a substrate supporting the two terminals, the single-walled carbon nanotube being displaced from the substrate between the terminals.

5. The vacuum gauge of claim 3, the single-walled carbon nanotube being 5 µm to 10 µm in length between the terminals.

6. The vacuum gauge of claim 3, the temperature coefficient of resistivity $\alpha$ of the vacuum gauge including the terminals and the single-walled carbon nanotube being in the magnitude of $-0.01$ $K^{-1}$.

7. A vacuum gauge comprising
two terminals;
a source of constant voltage to the terminals;
a single-walled carbon nanotube in electrical communication between the terminals;
a calibration of measured electrical conductance of the single-walled carbon nanotube to magnitudes of vacuum about the single-walled carbon nanotube;
a current meter in electrical communication with the source of constant voltage, the single-walled carbon nanotube being 5 µm to 10 µm in length between the terminals and the temperature coefficient of resistivity $\alpha$ of the vacuum gauge including the terminals and the single-walled carbon nanotube being in the magnitude of $-0.01$ $K^{-1}$.

8. The vacuum gauge of claim 7 further comprising
a substrate supporting the two terminals, the single-walled carbon nanotube being displaced from the substrate between the terminals.

* * * * *

UNITED STATES PATENT AND TRADEMARK OFFICE
CERTIFICATE OF CORRECTION

PATENT NO.         : 8,387,465 B2
APPLICATION NO.    : 12/323017
DATED              : March 5, 2013
INVENTOR(S)        : Harish Manohara et al.

It is certified that error appears in the above-identified patent and that said Letters Patent is hereby corrected as shown below:

On the title page, item 57, in the Abstract, line 20, "tower" should read -- lower --.

In the Specification

Column 2, line 65: "q" should read -- $\alpha$ --.

Column 2, line 66: "~0.011 K$^{-1}$ and ~0.038 K$^{-1}$" should read -- ~-0.011 K$^{-1}$ and -0.038 K$^{-1}$ --.

Column 6, line 25: "H. Dal," should read -- H. Dai, --.

Signed and Sealed this
Tenth Day of December, 2013

Margaret A. Focarino
*Commissioner for Patents of the United States Patent and Trademark Office*